US012744817B2

(12) United States Patent
Lopes et al.

(10) Patent No.: US 12,744,817 B2
(45) **Date of Patent: *Sep. 22, 2026**

(54) REMOVING NOISY INTRUSION DETECTION SYSTEM RULES THAT GENERATE EXCESSIVE ALERTS

(71) Applicant: Rapid7, Inc., Boston, MA (US)

(72) Inventors: Luis Lopes, Galway (IE); Sarah Addis, Belfast (GB); Martin Hutchings, Belfast (GB); Ralph McTeggart, Belfast (GB); Niall Cochrane, Belfast (GB)

(73) Assignee: Rapid7, Inc., Boston, MA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/536,356

(22) Filed: Dec. 12, 2023

(65) Prior Publication Data

US 2024/0155006 A1 May 9, 2024

Related U.S. Application Data

(63) Continuation of application No. 17/399,395, filed on Aug. 11, 2021, now Pat. No. 11,876,834.

(51) Int. Cl.
*H04L 9/40* (2022.01)

(52) U.S. Cl.
CPC .................................. *H04L 63/20* (2013.01)

(58) Field of Classification Search
CPC ...................................................... H04L 63/20
USPC ............................................................ 726/1
See application file for complete search history.

(56) References Cited

U.S. PATENT DOCUMENTS 11,838,329 B1 * 12/2023 Lopes ................... H04L 63/205
11,876,834 B1 * 1/2024 Addis ..................... H04L 63/20
2003/0065926 A1 * 4/2003 Schultz ................. G06F 21/562 713/188
2005/0076245 A1 * 4/2005 Graham .............. H04L 63/0218 726/4

(Continued)

FOREIGN PATENT DOCUMENTS

CN 101227331 A 7/2008
JP WO2015/208158 A1 4/2018

*Primary Examiner* — Michael S McNally
(74) *Attorney, Agent, or Firm* — Ashwin Anand

(57) ABSTRACT

New intrusion detection system (IDS) rules to be deployed on an IDS that generates alerts based on an applied ruleset are accessed. A trial window that includes incorporating the new IDS rules into a candidate list to enable summarization and filtering of the alerts is started and the applied ruleset that includes existing IDS rules is supplemented with the candidate list that includes the new IDS rules. The applied ruleset is transmitted to a network sensor associated with the IDS upon the supplementation and alerts generated based on network events implicated by both the existing IDS rules and the new IDS rules in the applied ruleset are received from the IDS. Upon completion of the trial window, a set of alerts generated only by the new IDS rules in the applied ruleset are designated as suppressed alerts and a set of new IDS rules is eliminated from the applied ruleset upon determining that the set of new IDS rules generate a subset of alerts that exceed an alert threshold. The update and modified applied ruleset is then transmitted to the network sensor associated with the IDS.

18 Claims, 7 Drawing Sheets

(56) References Cited

U.S. PATENT DOCUMENTS

2005/0262560 A1* 11/2005 Gassoway ............. H04L 63/145
713/188
2007/0094728 A1* 4/2007 Julisch ................ H04L 63/1491
726/23
2007/0174768 A1* 7/2007 Sen ..................... H04L 41/0604
340/506
2014/0325653 A1* 10/2014 Altman ............... H04L 63/1416
726/23
2016/0098402 A1 4/2016 Filippi et al.
2017/0099305 A1* 4/2017 Schwartz ............ H04L 63/1425

* cited by examiner

REMOVING NOISY INTRUSION DETECTION SYSTEM RULES THAT GENERATE EXCESSIVE ALERTS

This Application claims priority under 35 U.S.C. § 120 and is a continuation of U.S. patent application Ser. No. 17/399,395 filed Aug. 11, 2021, titled "Secure Verification of Detection Rules on Test Sensors" the entire contents of which are incorporated herein by reference in its entirety.

BACKGROUND

Field of the Disclosure

This disclosure is related is to automatically selecting actionable intrusion detection system (IDS) rules through a closed loop feedback system implemented in cybersecurity computing environments.

Description of the Related Art

An intrusion detection system (IDS) is a device or software application that monitors a network or systems for malicious activity or policy violations. An intrusion activity or violation can be collected centrally using a security information and event management system (STEM). IDSs generate alerts based on network events implicated by IDS rules. Such alerts triggered by IDSs are typically sent to or received by a cloud security platform, a client, a user, and/or a security analyst for event analysis, investigation, and remediation.

There are thousands of rules available for various IDSs. These plethora of ever changing rules can generate an overwhelming amount of alerts. Because alerts are converted and correlated to events which caused or triggered them, the unreasonable amount of events that may require the attention of a security analyst can cause alert fatigue. Alert fatigue may lead to important alerts being ignored or missed by customers. Unfortunately, existing solutions that involve applying a curated ruleset or filters to reduce noise require regular maintenance are unhelpful, since the available rules are continuously updated. What's more, given the excess of such rules and constantly changing configurations, breaking changes and secure verification associated with new IDS rules are a concern with respect to network sensor deployment.

SUMMARY OF THE DISCLOSURE

Methods, systems, and processes for auto-selecting actionable intrusion detection system (IDS) rules in cybersecurity computing environments are disclosed. One such method, system, or process involves, in various embodiments, accessing new intrusion detection system (IDS) rules to be deployed on an IDS that generates alerts based on an applied ruleset, starting a trial window that includes incorporating the new IDS rules into a candidate list to enable summarization and filtering of the alerts, supplementing the applied ruleset that includes existing IDS rules with the candidate list that includes the new IDS rules, transmitting the applied ruleset to a network sensor associated with the IDS upon the supplementation, receiving from the IDS the alerts generated based on network events implicated by both the existing IDS rules and the new IDS rules in the applied ruleset, designating a set of alerts generated only by the new IDS rules in the applied ruleset as suppressed alerts, eliminating a set of new IDS rules from the applied ruleset upon determining that the set of new IDS rules generate a subset of alerts of the set of alerts that exceed an alert threshold upon completion of the trial window, and transmitting the applied ruleset to the network sensor associated with the IDS.

In one embodiment, the summarization includes bifurcating the alerts into the set of alerts generated by the new IDS rules and another set of alerts generated by the existing IDS rules, removing from the suppressed alerts another subset of alerts that do not exceed the alert threshold, and adding to the applied ruleset, another set of new IDS rules associated with the another subset of alerts that do not exceed the alert threshold. In another embodiment, the filtering includes maintaining statistical metadata on each suppressed alert associated with the set of new IDS rules that are part of the suppressed alerts, instead of eliminating the set of new IDS rules from the applied ruleset. In some embodiments, the method, system, or process involves storing a packet sample generated by the IDS for each suppressed alert.

In certain embodiments, the method, system, or process involves inhibiting the suppressed alerts from being converted into associated events and summarizing the suppressed alerts for inclusion in a user notification, and in other embodiments, involves incrementing a counter each time a new IDS rule in the candidate list is triggered and suppressing conversion of an alert generated by the IDS for the triggering of the new IDS rule, into an event.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
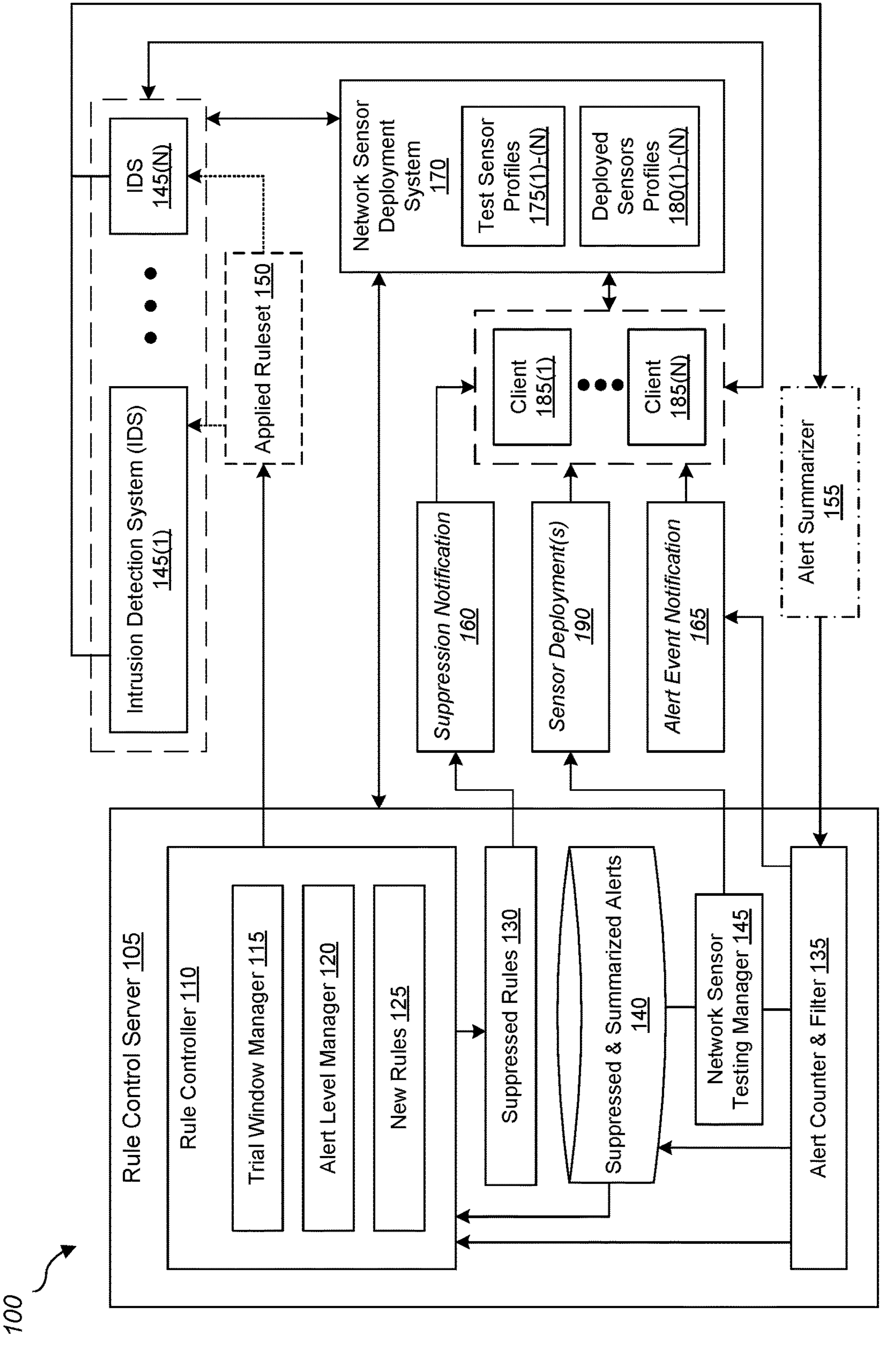
FIG. 1 is a block diagram 100 of a rule control server, according to some embodiments.

While the disclosure is susceptible to various modifications and alternative forms, specific embodiments of the disclosure are provided as examples in the drawings and detailed description. The drawings and detailed description are not intended to limit the disclosure to the particular form disclosed. The intention is to cover all modifications, equivalents and alternatives falling within the spirit and scope of the disclosure as defined by the appended claims.

DETAILED DESCRIPTION

Introduction

An intrusion detection system (IDS) is a device or software application that monitors a network or computing systems for malicious activity or policy violations. An intrusion activity or violation can be reported either to a security analyst or collected centrally using a security information and event management (SIEM) system, such as InsightIDR provided by Rapid7®, Inc. of Boston, MA. There are tens of thousands of rules available for modern IDSs (e.g., Suricata, Snort, and the like), that can potentially generate an overwhelming amount of alerts.

An activity that occurs on a network is called an event (e.g., a list of all websites visited in the past 24 hours from a given computing system). An event that is of particular interest from a security perspective is called an alert (e.g., an alert is an event that is of security interest and requires attention and potential action). An alert from an IDS is converted into an event based on a 1:1 mapping. Having a large number of events is not in and of itself a cause for concern (e.g., voluminous web traffic, which is expected behavior). However, for an IDS, it is preferable to have as few alerts as possible (e.g., as evidence of a clean network).

One solution to control the number of alerts is to have a graded ruleset that focuses only on certain events that are important (e.g., to a company or organization) from a cybersecurity perspective. This ruleset can be published and updated, as needed. Therefore, in an IDS, rules apply to events (e.g., network traffic) to generate alerts (e.g., if there is a match). For example, if a domain name system (DNS) query from a website is detected (e.g., an event), an alert can be generated by the IDS that a person or an entity tried to look up the domain (e.g., an alert).

Unfortunately, and as alluded to earlier, too many rules means too many alerts and a potential security gap. Excessive alerts, as noted, can cause alert fatigue and the unintended missing of important alerts. On the other hand, simply reducing the number of rules (e.g., in the graded ruleset) can inadvertently leave out rules that can potentially detect important malicious activity. Moreover, adding or removing rules to filter alerts that come out of the IDS in the foregoing manner (e.g., in the form of a curated ruleset or filters to reduce noise) is a manual and painstaking process, given that IDS rules are continuously updated.

Network sensors, such as the Insight Network Sensor provided by Rapid7®, Inc. of Boston, MA allow a SIEM (e.g., InsightIDR) to monitor, capture, and assess the end-to-end network traffic moving through physical and virtual computing environments. InsightIDR can leverage network sensor data for distinct use cases. However, new IDS rules are available frequently (e.g., daily or weekly). With IDS rule configurations changing so frequently, users need assurances that there will be no breaking changes once new (IDS) rules are pushed to network sensors. For example, a (new) IDS rule can break a network sensor because the IDS rule may not be parsed correctly by the network sensor or the underlying IDS engine.

Therefore, IDS rules need to be validated and verified on test (network) sensors before a new configuration is pushed out to customers globally in a secure manner (with only authorized parties having the ability to release new rule configurations). Unfortunately, approving and deploying new IDS rules for network sensors is also a manual process. Moreover, the ability to update rules on multiple globally-deployed customer sensors is necessary to address at least: (a) changes in the threat landscape that require response, (b) one or more rules being too noisy, and (c) rules collectively not producing enough (or any) data.

Disclosed herein are various systems, methods, and processes for performing and facilitating at least: (a) automatic selection of IDS rules through a closed loop feedback system and (b) verification of IDS rules on a set of test sensors for global release to network sensors.

Example Rule Control Server for Selecting Intrusion Detection System Rules

In various embodiments, a deployed IDS ruleset (hereinafter deployed or applied ruleset) is automatically adjusted from an available pool (e.g., of new IDS rules). Rules that generate an excessive number of alerts are considered too noisy to be useful and are automatically removed from the applied ruleset and saved separately (e.g., for security analyst review). Alternatively, the noisy rules can also be deployed, but alerts associated with these noisy rules are summarized so that the alerts can be inspected on demand, but are not used to generate user notifications. In this context, an IDS rule (hereinafter rule) that generates excessive alerts can be considered useless. A rule is useful if the rule detects a useful security incident (e.g., an attack, an open security door, and the like). Advantageously, a centralized platform for receiving alerts from IDSs and automatically adjusting subsequently applied rulesets is disclosed.

FIG. 1 is a block diagram 100 of a rule control server 105. Rule control server 105 can be any type of physical or virtual computing device and includes at least a rule controller 110 with a trial window manager 115, an alert level manager 120, and new rules 125 (e.g., the available pool of new IDS rules as noted above). Rule controller 110 generates suppressed rules 130 (e.g., 130(1)-(N)) and includes an alert counter and filter 135 that generates suppressed and summarized alerts 140. Rule control server 105 also includes a network sensor testing manager 145 (e.g., for deploying tested and verified network sensors in a secure manner based on changes and/or updates to IDS rules processed by (or available to) rule controller 110). In one embodiment, rule control server 105 is part of a centralized cloud-native cybersecurity platform such as the Insight Platform provided by Rapid7®, Inc. of Boston, MA.

As shown in FIG. 1, rule control server 105 is communicatively coupled to one or more intrusion detection systems (IDSs) 145(1)-(N), as well as a network sensor deployment system 170 (e.g., via a network such as the Internet or any other type of interconnection). Network sensor deployment system includes test sensor profiles 175(1)-(N) and deployed sensor profiles 180(1)-(N). Examples of IDSs include, but are not limited to, Suricata, Snort, Kismet, Zeek, Open DLP, Sagan, Security Onion, and the like. Rule controller 110 also generates, curates, and provides an applied ruleset 150 (e.g., a deployed ruleset) to one or more of IDSs 145(1)-(N). IDSs 145(1)-(N) are executed by (and are part of) clients 185(1)-(N), which can be any type of physical or virtual computing devices (e.g., protected computing devices on a customer network). For example, client 185(1) can execute IDS 145(1) and client 185(2) can execute IDS 145(2), but client 185(3) can execute IDSs 145(3) and 145(4). Therefore, a given client can execute one (or more) IDSs.

An alert summarizer 155, which is implemented (and/or executed) by rule control server 105, acts as an intermediary between IDSs 145(1)-(N) and alert counter and filter 135. As shown in FIG. 1, suppressed rules 130 result in a suppression notification 160 being generated by rule controller 110, alert counter and filter 135 generates an alert event notification 165, and network sensor testing manager 145 performs sensor deployment(s) 190. Suppression notification 160 and alert event notification 165 are sent from rule control server 105 to one or more of clients 185(1)-(N) (e.g., to one or more IDSs 145(1)-(N) as IDSs 145(1)-(N) are implemented (and executed) by clients 185(1)-(N)). Sensor deployment(s) 190 of tested and verified network sensors are also securely performed on one or more of clients 185(1)-(N).

Example of Automatically Curating Actionable Intrusion Detection System Rules

In one embodiment, rule controller 110 accesses new IDS rules (e.g., new rules 125) to be deployed on an IDS (e.g., IDS 145(1)) that generate alerts based on an applied ruleset (e.g., applied ruleset 150). Trial window manager 115, which is implemented by rule controller 110, starts a trial window that includes incorporating the new IDS rules (e.g., new rules 125) into a candidate list to enable summarization and filtering of the alerts (e.g., shown as suppressed and summarized alerts 140 in FIG. 1). Rule controller 110 supplements applied ruleset 150 with the candidate list that includes new rules 125. It should be noted that prior to this supplementation performed by rule controller 110, applied ruleset 150 only includes existing IDS rules (hereinafter existing rules), but not new rules 125—which are part of the candidate list).

In the foregoing example, upon supplementation (e.g., with new rules 125 in the candidate list) rule controller 110 transmits (the supplemented) applied ruleset 150 (e.g., applied ruleset 150(*a*)) to a network sensor associated with an IDS. Rule control server 105 then receives one or more alerts generated by one or more network events (e.g., the various user and/or device-related events that occur on a given network) implicated by both the existing (IDS) rules and new IDS rules (e.g., new rules 125, or hereinafter new rules) in applied ruleset 150 (e.g., the supplemented applied ruleset). Network events capture details of one device communicating with another over the given network. Depending on the data source, a network event can contain details of internet protocol (IP) addresses, network protocols, headers, and device roles.

In some embodiments, alert level manager 120, which is implemented by rule controller 110 designates a set of alerts generated only by the new IDS rules (e.g., new rules 125) in applied ruleset 150 as suppressed alerts (e.g., suppressed and summarized alerts 140) and then eliminates a set of new IDS rules (e.g., a subset of new rules 125) from applied ruleset 150 upon determining that the set of new IDS rules generate a subset of alerts (of the set of alerts) that exceed an alert threshold upon completion of the trial window (e.g., suppressed rules 130). Rule controller 110 then transmits (the newly updated and modified but previously supplemented) applied ruleset 150 (e.g., applied ruleset 150(*b*)) to the network sensor associated with the IDS. Advantageously, new rules that generate too many alerts (e.g., over a given threshold) can cause alert fatigue can be automatically eliminated (e.g., suppressed rules 130 as shown in FIG. 1).

In certain embodiments, the summarization performed by alert summarizer 155 includes at least (a) bifurcating the alerts (e.g., all alerts generated by the IDS) into the set of alerts generated by new rules 125 and another set of alerts generated by existing rules, (b) removing from the suppressed alerts (e.g., suppressed and summarized alerts 140) another subset of alerts that do not exceed the alert threshold established by alert level manager 120, and (c) adding to applied ruleset 150, another set of new IDS rules (e.g., another subset of new rules 125) associated with the another subset of alerts that do not exceed the alert threshold.

In some embodiments, the filtering performed by alert counter and filter 135 includes maintaining statistical metadata on each suppressed alert associated with the set of new IDS rules that are part of the suppressed alerts, instead of eliminating the set of new IDS rules from applied ruleset 150. Statistical metadata for a suppressed alert can include the storing of a packet sample generated by the IDS for the suppressed alert.

In other embodiments, rule controller 110 inhibits the suppressed alerts (e.g., suppressed and summarized alerts 140) from being converted into associated events and summarizes the suppressed alerts for inclusion in a user notification. Rule controller 110 also increments a counter each time a new IDS rule in the candidate list is triggered (e.g., in suppressed rules 130) and suppresses (or prevents) conversion of an alert generated by the IDS for triggering the new IDS rule, into an event (e.g., a network event with a 1:1 mapping with the corresponding alert)—thus, advantageously preventing alerts from non-actionable rules from being presented as network events that need action and/or attention (e.g., from a security analyst).

Example of Securely Deploying Tested and Verified Network Sensors

In one embodiment, network sensor testing manager 145 detects an update or a modification to applied ruleset 150 that is intended for consumption by one or more IDSs (e.g., the initially supplemented applied ruleset 150(*a*) or the later updated/modified applied ruleset 150(*b*), as discussed infra and supra). Next, network sensor testing manager 145 triggers an event (e.g., a service event or local event—not a network event, as discussed above) that is configured to push (or deploy) the applied ruleset (e.g., applied ruleset 150(*a*) or 150(*b*)) to a set of test network sensors (of a global set of network sensors) associated with the IDSs (e.g., based on deployed sensor profiles 180(1)-(N)).

In this example, a service subscribed to the event updates the set of network sensors with the supplemented applied ruleset (e.g., applied ruleset 150(*a*)) or modified/updated applied ruleset (e.g., applied ruleset 150(*b*)) and designates a configuration version (e.g., an organization identifier, and the like) to the given applied ruleset. Network sensor testing manager 145 receives a notification from the set of network sensors that the applied ruleset has been tested (e.g., based on test sensor profiles 175(1)-(N)) and is ready for deployment to the network sensors (e.g., the global set of network sensors).

Further, network sensor testing manager 145 receives a request to deploy the applied ruleset to a set of network sensors (that may or may not be part of the set of test network sensors) of the various multiple network sensors and determines whether the request includes the configuration version designated to the applied ruleset by the service. If the request includes the configuration version designated to the applied ruleset, network sensor testing manager 145 authorizes the request to deploy the applied ruleset to the set of network sensors. However, if the request does not include the configuration version designated to the applied ruleset (or includes the incorrect configuration version), network sensor testing manager 145 denies the request to deploy the applied ruleset to the set of network sensors.

In some embodiments, network sensor testing manager 145 receives from the set of test network sensors, alerts generated based on network events implicated by a global set of IDS rules in the applied ruleset (e.g., applied ruleset 150(*a*) supplemented with the candidate list or applied ruleset 150(*b*) further updated or modified after the end of the trial window, as discussed above). In this example, prior to deploying the applied ruleset to the set of network sensors, network sensor testing manager 145 removes one or more IDS rules from the global set of IDS rules that were applied (or pushed) to the applied ruleset by the supplementation, update, and/or the modification from the applied ruleset.

In other embodiments, if the applied ruleset has already been deployed to the set of network sensors, alert counter and filter 135 suppresses or conceals one or more alerts generated by the one or more IDS rules (e.g., from the global set of IDS rules that were pushed to the applied ruleset by the update or the modification) and inhibits or prevents the alerts (from the IDS(s)) from being converted into corresponding events (e.g., fatigue-causing network events).

As previously noted, breaking changes can unfortunately occur if a given IDS rule breaks a network sensor. For example, among other reasons, if the given IDS rule is not parsed correctly by the network sensor or the underlying IDS engine, a breaking change can occur. In one embodiment, network sensor testing manager 145 determines that a given IDS rule can cause a breaking change, identifies test sensors that are affected by the breaking change, and further updates or modifies the applied ruleset prior to deployment to the set of network sensors to exclude the IDS rule that causes (or is causing) the breaking change.

Example Intrusion Detection System Rule Management Cloud Platform

Figure 2:
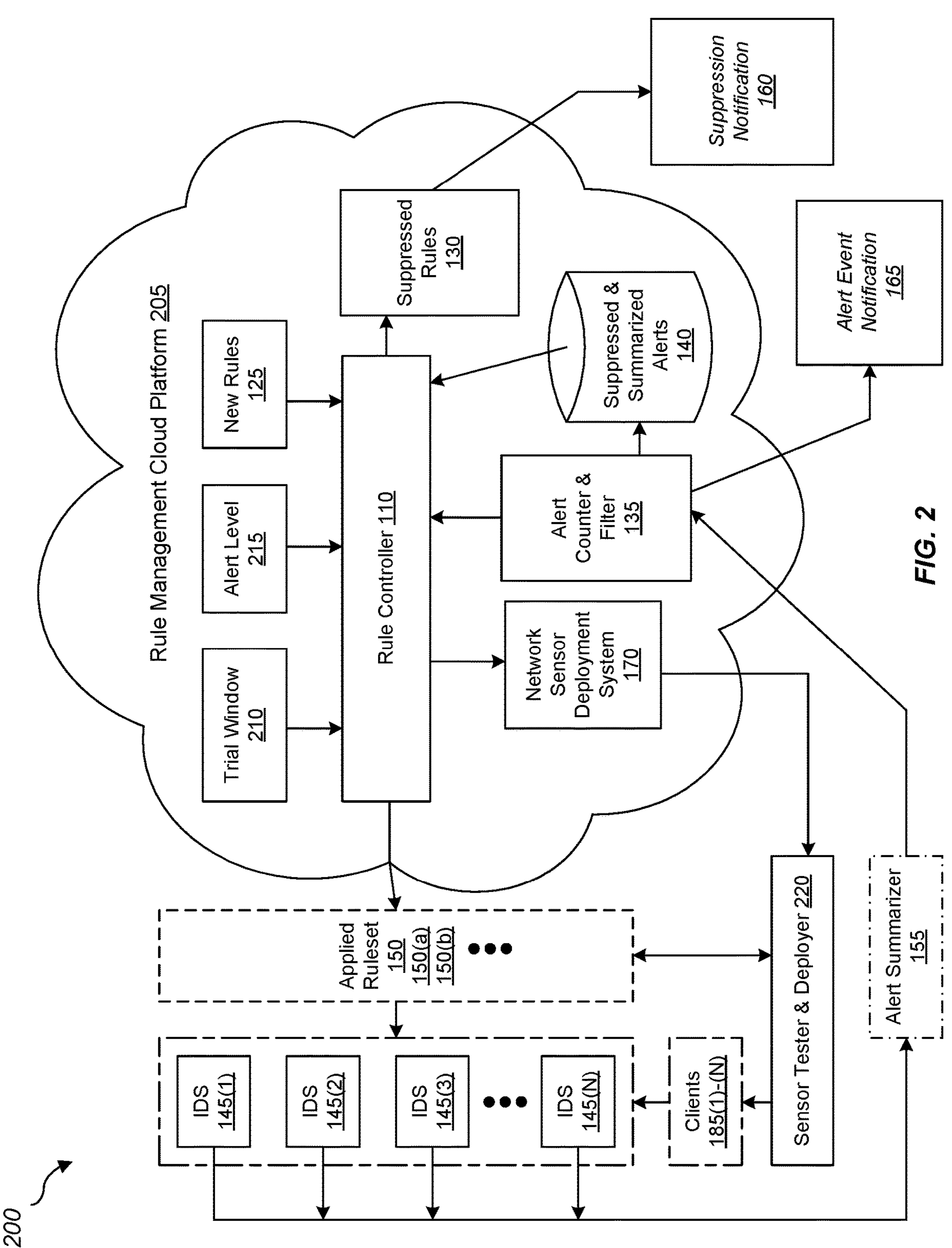
FIG. 2 is a block diagram 200 of a rule management cloud platform, according to some embodiments.

FIG. 2 is a block diagram 200 of a rule management cloud platform 205. Rule management cloud platform 205 is a centralized cloud-native cybersecurity platform like the Insight Platform provided by Rapid7®, Inc. of Boston, MA. Rule management cloud platform 205 includes at least rule controller 110, suppressed rules 130 (from which suppression notification 160 is generated), alert counter and filter 135 (from which alert event notification 165 is generated), suppressed and summarized alerts 140, and network sensor deployment system 170 (which manages sensor tester and deployer 220). Rule management cloud platform 205 also includes a trial window 210, an alert level 215, and new rules 125, all of which are managed by rule controller 110 to facilitate the automatic selection of actionable IDS rules.

In one embodiment, rule controller 110 accesses new IDS rules (e.g., new rules 125) to be deployed on and pushed to the network sensor(s) of one or more IDSs (e.g., IDSs 145(1)-(N)). IDSs 145(1)-(N) generate one or more alerts based on a modifiable and updateable applied ruleset that is created, managed, updated, modified, and provided by rule controller 110. Rule controller 110 then starts a trial window 210 that includes incorporating new rules 125 into a candidate list to enable summarization and filtering of the one or more alerts. Rule controller 110 supplements applied ruleset 150 that, as of this moment, includes only existing IDS rules, with new rules 125 in the candidate list. After the foregoing supplementation, rule controller 110 transmits applied ruleset 150 to a network sensor associated with each of one or more IDSs 145(1)-(N)). Rule controller 110 receives a group of alerts generated based on network events implicated by both the existing IDS rules and new rules 125 in applied ruleset 150 from IDSs 145(1)-(N), optionally, via alert summarizer 155.

Rule controller 110 designates a set of alerts of the group of alerts generated only by new rules 125 in applied ruleset 150 as suppressed rules 130 (e.g., suppressed rules 130 whose alerts are to be suppressed). Upon completion of trial window 210, rule controller 110 eliminates a set of new rules 125 from applied ruleset 150 upon determining that the set of new rules 125 generate a subset of alerts (of the set of alerts of the group of alerts) that exceed an alert threshold (e.g., alert level 215)—thus generating applied ruleset 150(*a*) (e.g., the first of at least three possible updates/modifications). Rule controller 110 then transmits applied ruleset 150(*a*) to the network sensor associated with each of one or more IDSs 145(1)-(N).

In some embodiments, alert level 215 can determined by at least the following factors applicable to events implicated by a given alert for a given (new) rule: an unvalidated vulnerability, a validated vulnerability, an external threat previously unencountered, an internal threat previously encountered, modifications to a given cloud configuration, updates to a cloud workload, changes to cloud identity and access, and the like. For example, rules that generate events for previously patched and validated vulnerabilities (as opposed to unvalidated vulnerabilities) can be determined to exceed alert level 215 can be suppressed and/or removed from the applied ruleset.

In certain embodiments, as part of the summarization process, alert summarizer 155, optionally, bifurcates the group of alerts into: (a) the set of alerts generated by new rules 125 and (b) another set of alerts generated by existing IDS rules (e.g., in applied ruleset 150 prior to supplementation). Rule controller 110 then is able to: (a) remove from suppressed rules 130 another subset of alerts of the set of alerts generated by new rules 125 that do not exceed alert level 215 and (b) add to applied ruleset 150(*a*), another set of new rules 125 associated with the another subset of alerts that also do not exceed alert level 215—thus creating applied ruleset 150(*b*), as shown in FIG. 2 (e.g., the second of at least three possible updates/modifications).

In one embodiment, the filtering process performed by alert counter and filter 135 includes maintaining statistical metadata on each suppressed alert associated with the set of new rules 125 that are part of suppressed rules 130 (e.g., in suppressed and summarized alerts 140), instead of eliminating the set of new rules 125 from applied ruleset 150(*a*) (e.g., as they may be indicative of suspicious or malicious activity). For example, alert counter and filter 135 stores a packet sample generated by each IDS for each suppressed alert.

Advantageously, and as will be appreciated, by supplementing, updating, and modifying (e.g., applied rulesets 150, 150(*a*), 150(*b*), . . . ) and bifurcating, summarizing, and suppressing IDS alerts (e.g., suppressed rules 130 and suppressed and summarized alerts 140), rule controller 110 is able to inhibit or prevent suppressed and summarized alerts 140 from being converted into associated events (e.g., fatigue-causing network events that should likely be ignored and/or removed for future applied rulesets). In this example, the suppressed alerts (e.g., suppressed and summarized alerts 140 triggered by suppressed rules 130) are summarized for inclusion in a user notification (e.g., suppression notification 160 as shown in FIG. 2). However, in other embodiments, alert counter and filter 135 can increment a counter each time a new IDS rule in the candidate list is triggered and can also suppress conversion of an alert generated by an IDS for triggering the new IDS rule, into an event. Alert even notification 165 thus advantageously permits a security analyst to review these alerts outside the fatigue-causing, time-consuming, cumbersome, and voluminous actionable alert-event paradigm.

Example of Secure Deployment of Independently Tested Network Sensors

As noted, network sensor testing manager 145 detects an update or a modification to applied ruleset 150 (e.g., applied ruleset 150(*a*), 150(*b*), . . . ). Providing IDSs with iteratively updated and modified applied rulesets permits network sensor deployment system 170 to securely update network sensors with IDS rules based on test sensor profiles 175(1)-(N) that are used to update network sensors with (previously) deployed sensor profiles 180(1)-(N).

Network sensor testing manager 145 pushes a given applied ruleset (as provisioned by rule controller 110) to a set of test network sensors on one or more of IDSs 145(1)-(N). Because network sensor deployment system 170 is executed in tandem with rule controller 110 as part of rule management cloud platform 205, network sensor deployment system 170 can designate a configuration version (e.g., an organization identifier, and the like) to the given applied ruleset. Once applied ruleset 150(*a*) or 150(*b*) is tested only based on test sensor profiles 175(1)-(N), network sensor deployment system 170 securely approves or denies (e.g., authenticates) a request to deploy the updated and modified applied ruleset to each network sensor associated with IDSs 145(1)-(N)—only if the request includes the configuration version previously designated to the updated and modified applied ruleset.

In this manner, the pushing of an applied ruleset modified based on triggered alerts can also be conditioned based on whether certain network sensor profiles are appended with the updated and modified applied ruleset. This conditional appending of modified applied rulesets to one or more specific test sensor profiles (e.g., applied ruleset 150(*a*) for test sensor profile 175(1), applied ruleset 150(*b*) for test sensor profile 175(2), and the like) that are further only deployable after a version or identifier-based authentication process (e.g., to a global set of network sensors associated with IDSs 145(1)-(N)), enables rule management cloud platform 205 to automatically select only actionable IDS rules, test only those actionable rules on test sensors, and deploy those sensors (along with appended applied rulesets) in a secure manner. Advantageously, and as will be appreciated, the resources, overhead, and human fatigue associated with alert management and sensor deployment in IDS environments are greatly reduced or eliminated.

Example Processes for Curating Actionable Intrusion Detection System Rules

Figure 3:
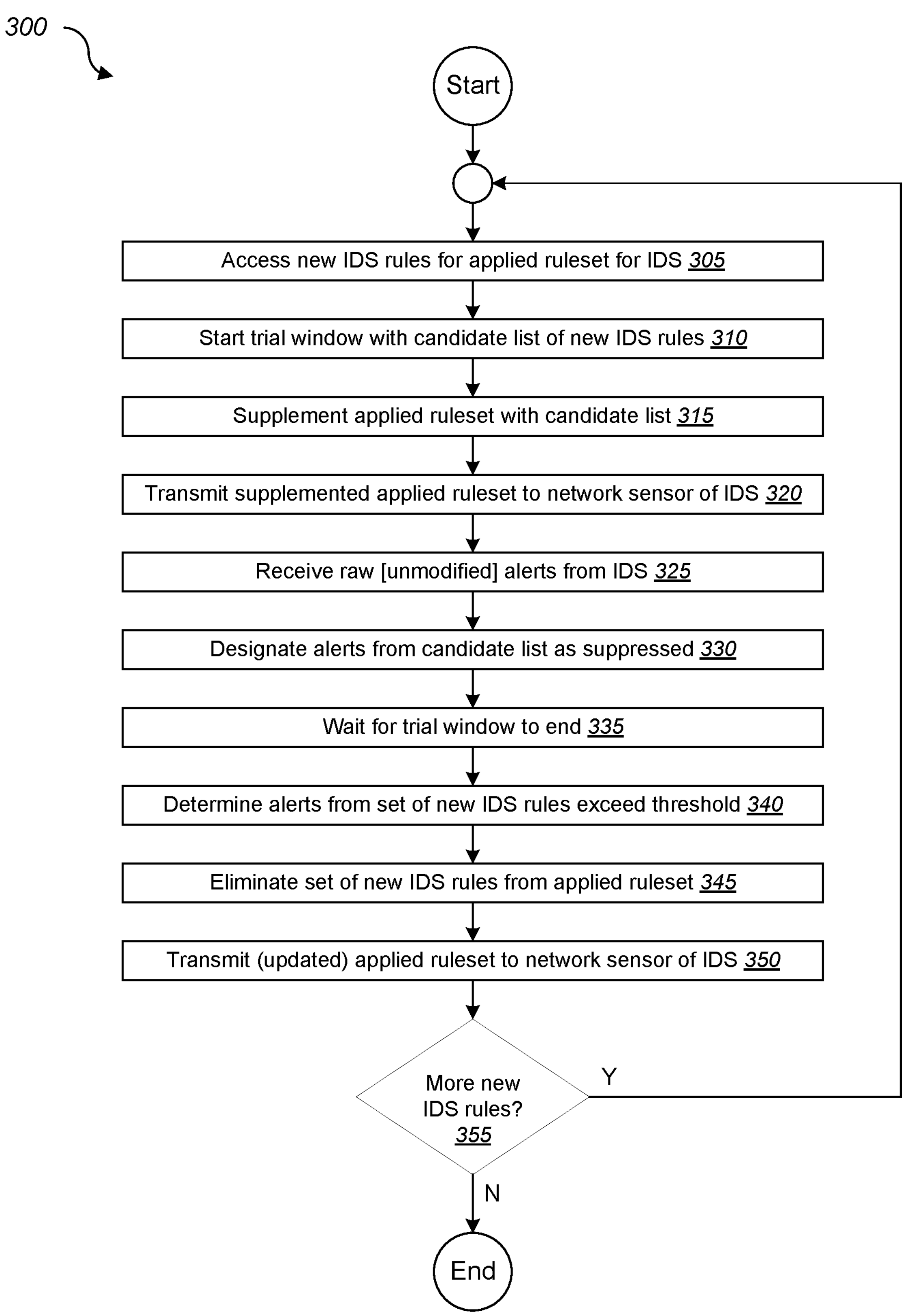
FIG. 3 is a flowchart 300 of a process for auto-selecting actionable intrusion detection system (IDS) rules, according to some embodiments.

FIG. 3 is a flowchart 300 of a process for auto-selecting actionable intrusion detection system (IDS) rules. The process begins at 305 by accessing new IDS rules for an applied ruleset for an IDS (e.g., new rules 125 for applied ruleset 150 for one or more IDSs 145(1)-(N) as shown in FIGS. 1 and 2). At 310, the process starts a trial window (e.g., trial window 210) with a candidate list of new IDS rules (e.g., as opposed to (the original/initial) ruleset that may only include only one or more existing IDS rules). At 315, the process supplements the existing, original, or initial IDS ruleset with the candidate list, and at 320, transmits the supplemented applied ruleset (shown in FIGS. 1 and 2 as applied ruleset 150) to a network sensor of an IDS.

At 325, the process receives raw (or unmodified) alerts from the IDS (optionally, via alert summarizer 155), and at 330, designates alerts from the candidate list as suppressed. At 335, the process waits for the trial window to end, and at 340, determines (and identifies) alerts from the new set of IDS rules exceed a threshold (e.g., alert level 215, which can be unique and/or pre-determined for each configuration version/organization identifier). At 345, the process eliminates the set of new IDS rules (e.g., a subset of new rules 125) from applied ruleset 345, and at 350, transmits the updated applied ruleset (e.g., applied ruleset 150(*a*)) to the network sensor of the IDS. At 355, the process determines if there are more new IDS rules. If there are more new IDS rules, the process loops to 305. Otherwise, the process ends.

Figure 4A:
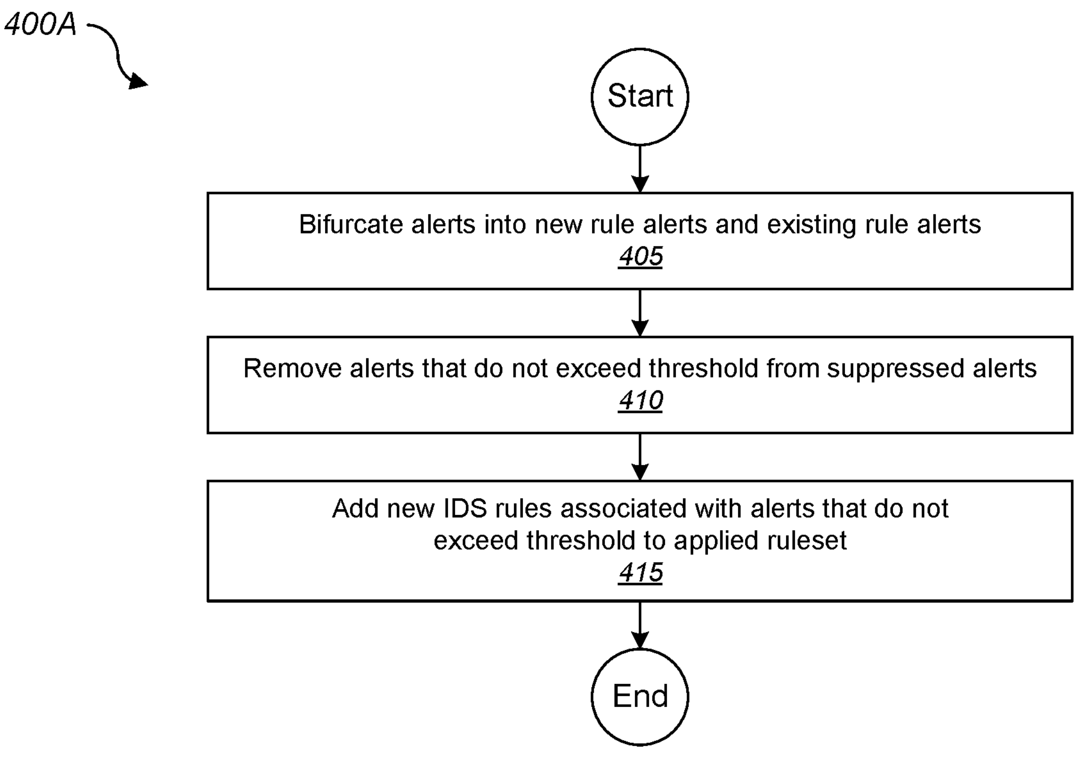
FIG. 4A is a flowchart 400A of a process for managing suppressed alerts and updating applied rulesets, according to some embodiments.

FIG. 4A is a flowchart 400A of a process for managing suppressed alerts and updating applied rulesets. The process begins at 405 by bifurcating alerts into new rule alerts and existing rule alerts (e.g., based on alerts triggered by the supplemented applied ruleset which includes the candidate list; this process can be performed by alert summarizer 155 which is part of rule control server 105 or rule management cloud platform 205). At 410, the process removes alerts that do not exceed a threshold from suppressed alerts (e.g., rule controller 110 removes one or more alerts summarized by alert summarizer 155 and part of suppressed and summarized alerts 140 from suppressed alerts (e.g., suppressed rules 130)). In this manner, an alert level 215 can be used to further correct or fine-tune the alert-event/notification model (and the resultant applied ruleset to be next or subsequently applied to the IDSs) by further basing event notification and alert-to-notification conversion on threshold factors that inform alert level 215 and that can be tailored to each particular client or customer of a given IDS. The process ends at 415 by adding new IDS rules associated with the foregoing alerts that do not exceed a given alert level to the applied ruleset (e.g., to generate applied ruleset 150(*b*)—the second/next/subsequent modification).

Figure 4B:
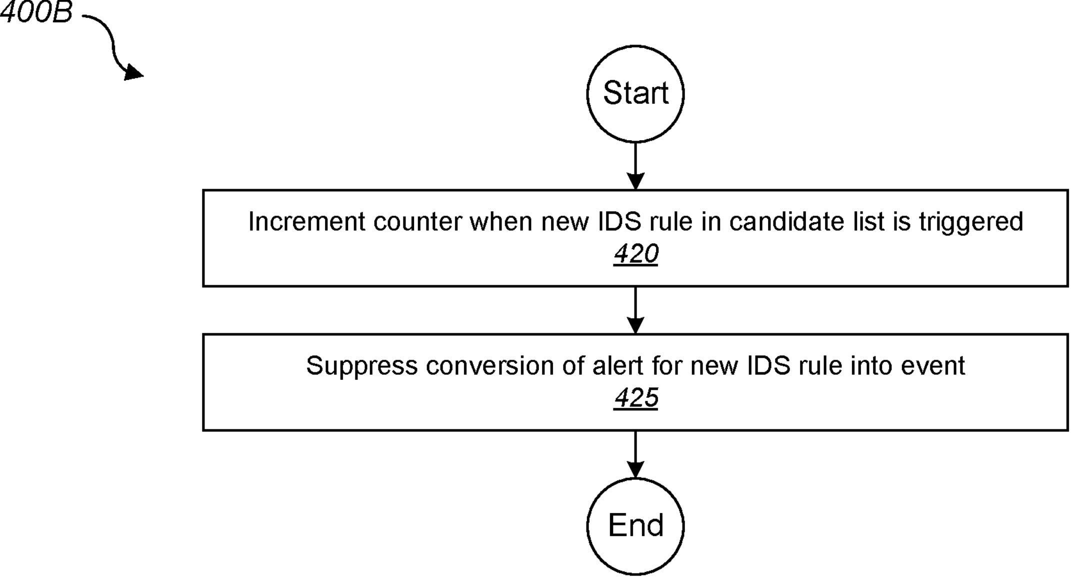
FIG. 4B is a flowchart 400B of a process for suppressing conversion of alerts for new IDS rules into events, according to some embodiments.

FIG. 4B is a flowchart 400B of a process for suppressing conversion of alerts for new IDS rules into events. The process begins at 420 when alert counter and filter 135 increments a counter when one or more new IDS rules in the candidate list (first used to supplement the initial or original ruleset) are triggered. The process ends at 425 by suppressing or preventing conversion of alert(s) associated with those one or more new IDS rules into (corresponding) events (e.g., network events that are actionable). In this manner, alerts caused by noisy rules can be prevented from generating non-actionable events that can lead to alert fatigue.

Processes to Securely Deploy Tested Sensors with Actionable Rules on IDSs

Figure 5:
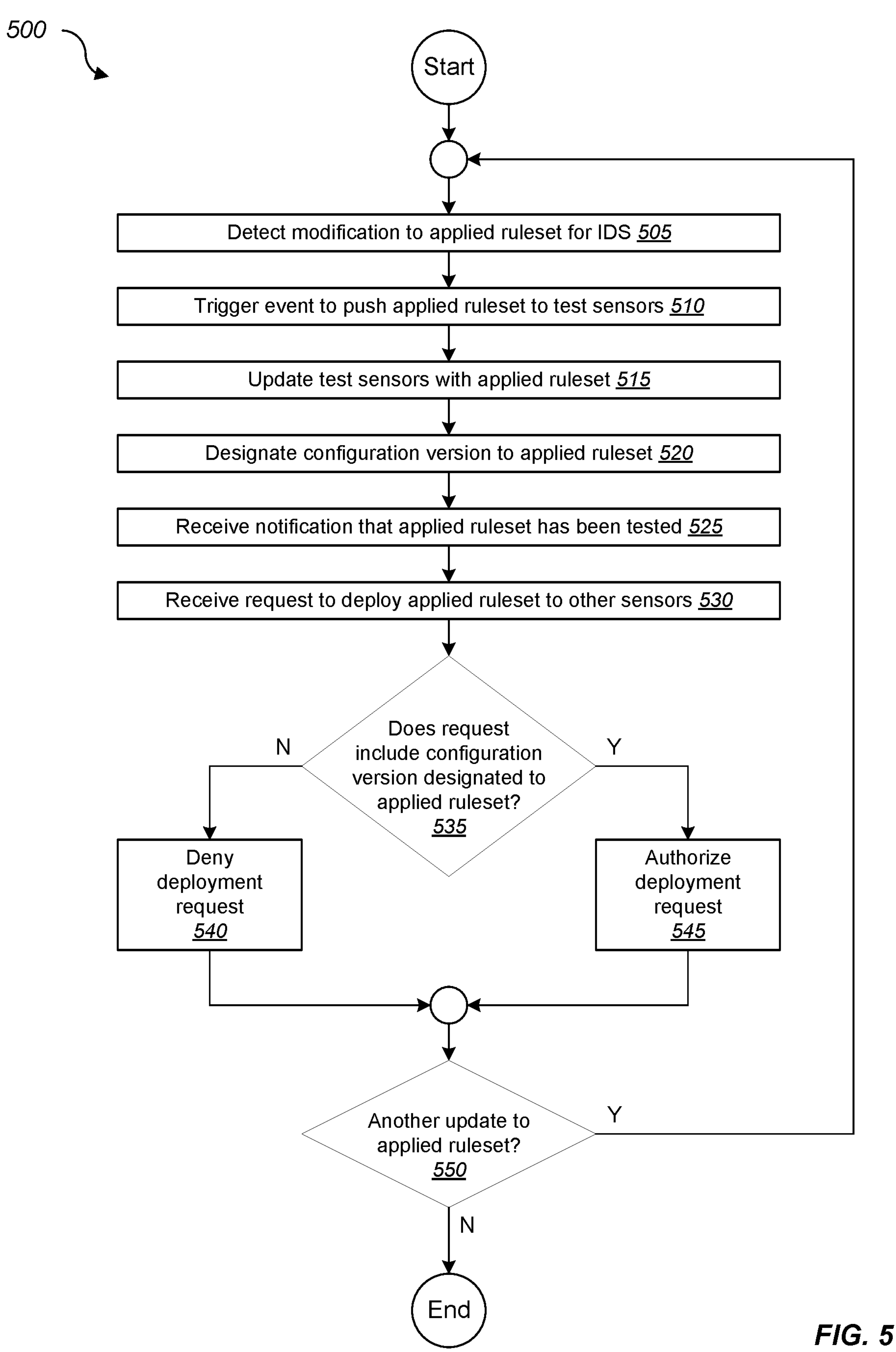
FIG. 5 is a flowchart 500 of a process for deploying test network sensors, according to some embodiments.

FIG. 5 is a flowchart 500 of a process for deploying test network sensors. The process begins at 505 by detecting a modification to an applied ruleset intended for an IDS, and at 510, triggers a local/service event to push the applied ruleset to test sensors. It should be noted that the applied ruleset in this example can be applied ruleset 150, applied ruleset 150(*a*), applied ruleset 150(*b*), and the like. At 515, the process updates the test network sensors with the applied ruleset (e.g., using test sensor profiles 175(1)-(N), which are appended with the applied ruleset). At 520, the process designates a configuration version to the applied ruleset.

In certain embodiments, the configuration version (e.g., an organization identifier, a test sensor profile key, or any other type of verified identification mechanism that can be authenticated) is associated with a given test sensor profile. Because the given test sensor profile is appended or attached with a given applied ruleset, the given applied ruleset is coupled or correlated with the configuration version such that network sensor deployment is not performed until a deployment request for a given network sensor that requests the given test sensor profile (or should be provisioned with the given test sensor profile) also includes the configuration version of the given test sensor profile, thus enabling verification prior to applied ruleset deployment via the given network sensor.

At 525, the process receives a notification that the applied ruleset has been tested. For example, testing can determine that there is no need to further suppress additional rules in a given applied ruleset (e.g., applied ruleset 150(*a*) might suffice without the need to generate a further iterated applied ruleset 150(*b*)). However, testing can also determine that a certain new IDS rule in the applied ruleset is causing a breaking change and has to be removed or purged from the applied ruleset prior to deploying the applied ruleset to a global set of network sensors (e.g., applied ruleset 150(*b*) or 150(*c*) . . . depending on the number of iterative updates and modifications have been performed to the applied ruleset up until that points).

At 530, the process receives a request to deploy the applied ruleset to other sensors (e.g., the global set of network sensors associated with IDSs 145(1)-(N)). As noted, the applied ruleset can be further modified by rule controller 110 in conjunction with network sensor deployment system 170 based on how the current version of the applied ruleset curated by rule controller 110 performs on test sensors (e.g., creating applied ruleset 150(*c*)—the last of at least three possible updates/modifications). At 535, the process determines whether the request includes the configuration version designated to the applied ruleset. If the request does not include the configuration version designated to the applied ruleset, the process, at 540, denies the deployment request. However, if the request does include the configuration version, the process, at 545, authorizes the deployment request. At 550, the process determines if there is another update to the applied ruleset (e.g., either by rule controller 110 or necessitated by network sensor deployment system 170 or network sensor testing manager 145 post-testing). If there is another update to the applied ruleset, the process loops to 505. Otherwise, the process ends.

Figures 6A, 6B:
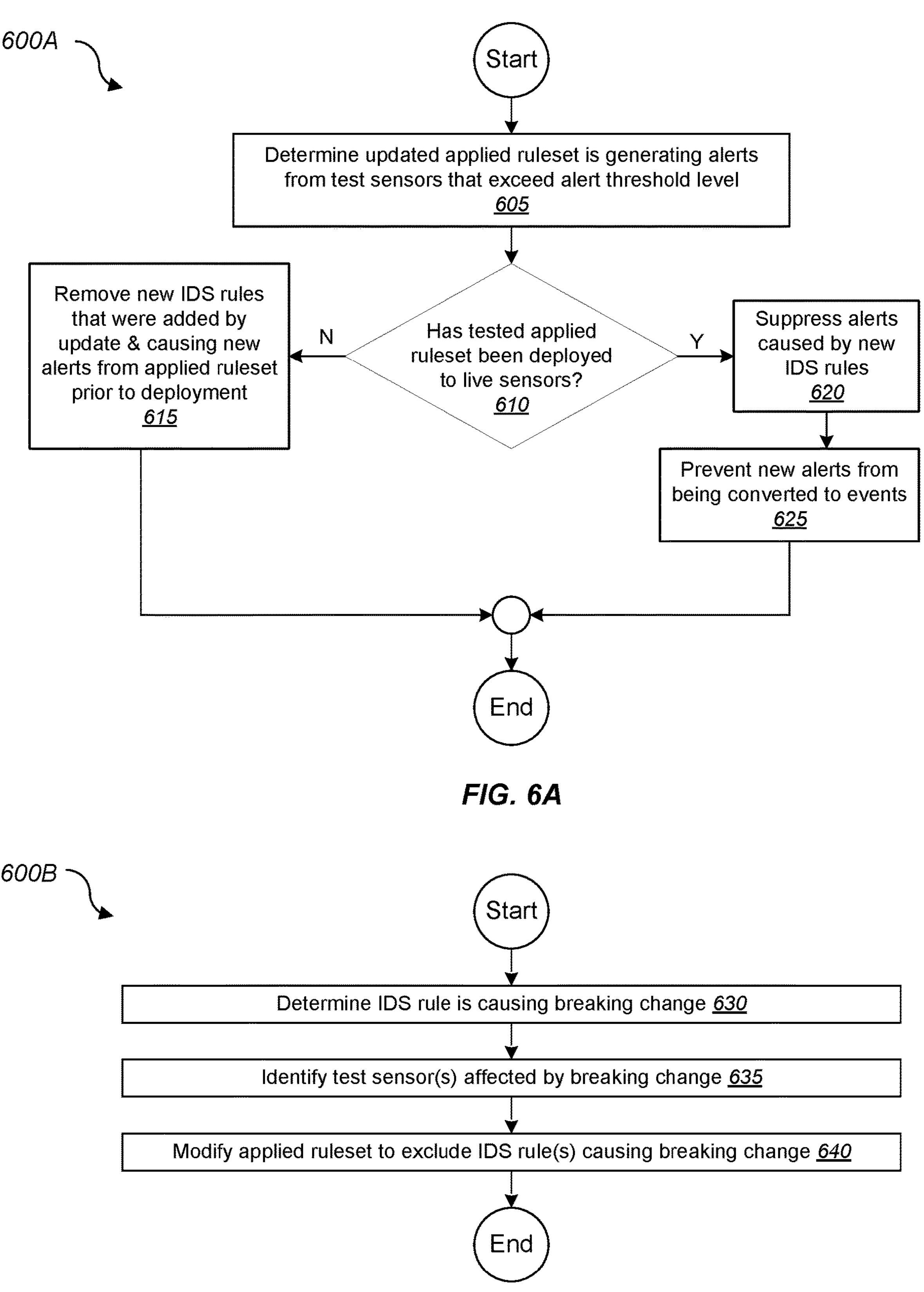
FIG. 6A is a flowchart 600A of a process for managing alerts from network sensors, according to some embodiments.
FIG. 6B is a flowchart 600B of a process for managing breaking changes associated with network sensors, according to some embodiments.

FIG. 6A is a flowchart 600A of a process for managing alerts from network sensors. The process begins at 605 by determining that an updated applied ruleset (e.g., one of applied rulesets 150(*a*), 150(*b*), 150(*c*), and the like) is generating alerts from test sensors that exceed an alert threshold level (e.g., alert level 215). In some embodiments, the alert threshold level can be based on the configuration version designated to the applied ruleset prior to network sensor deployment. For example, each organization identified by an organization identifier can have its own unique alert threshold level.

At 610, the process determines whether the tested (and verified) applied ruleset has been deployed to live sensors (e.g., non-test sensors and/or sensors with deployed sensor profiles 180(1)-(N)). If the tested applied ruleset has not been deployed to live sensors, the process ends at 615 by removing new IDS rules that were added by the update (e.g., rules added for/during the most previous update that are causing new alerts to be generated). For example, applied ruleset 150(*c*) can be rolled back to applied ruleset 150(*b*) and applied ruleset 150(*b*) can be rolled back to applied ruleset 150(*a*), and the like. However, if the tested applied ruleset has (already) been deployed to live sensors, the process, at 620, suppresses alerts caused by the new IDS rules (e.g., adds those rules to suppressed rules 130), and ends at 625 by preventing or inhibiting the new alerts from being converted into events.

FIG. 6B is a flowchart 600B of a process for managing breaking changes associated with network sensors. The process begins at 630 by determining that an IDS rule is causing (or causes) a breaking change. For example, the process can determine that, among other reasons that can cause the breaking change, the IDS rule cannot be parsed correctly or successfully by the test network sensor or the underlying IDS engine (associated with the test network sensor). At 635, the process identifies those test sensor(s) affected by the breaking change (e.g., based on test sensor profiles), and ends at 640 by modifying the applied ruleset to exclude those IDS rule(s) that are causing (or cause) the breaking change.

Advantageously, the systems, methods, and processes disclosed herein perform and facilitate (a) automatic curation and selection of only actionable IDS rules through a closed loop feedback system to reduce alert fatigue and (b) secure verification of IDS rules on a set of test sensors for global release to network sensors.

Example Computing and Networking Environment

Figure 7:
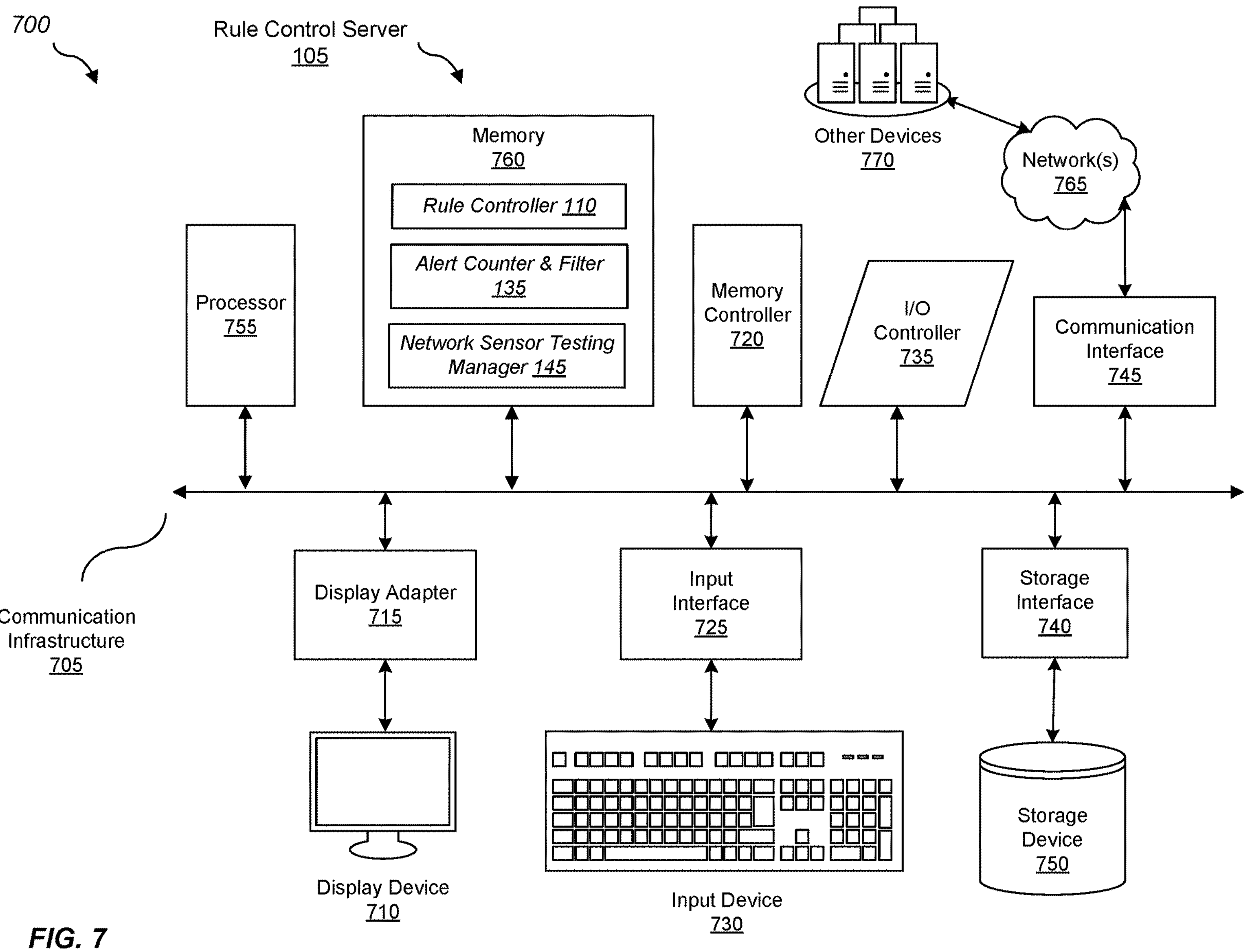
FIG. 7 is a block diagram 700 of a networked computing system, illustrating how a rule controller can be implemented in software, according to some embodiments.

FIG. 7 is a block diagram 700 of a computing system, illustrating how a rule controller 110 and/or a network sensor testing manager 145 can be implemented in software, according to one embodiment. Computing system 700 can include rule control server 105 or rule management cloud platform 205 and broadly represents any single or multiprocessor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 755 and a memory 760. By executing the software that executes rule controller 110 and/or network sensor testing manager 145 computing system 700 becomes a special purpose computing device that is configured to (a) automatically select and curate actionable IDS rules and (b) securely deploy verified and tested IDS rules on network sensors.

Processor 755 generally represents any type or form of processing unit capable of processing data or interpreting and executing instructions. In certain embodiments, processor 755 may receive instructions from a software application or module. These instructions may cause processor 755 to perform the functions of one or more of the embodiments described and/or illustrated herein. For example, processor 755 may perform and/or be a means for performing all or some of the operations described herein. Processor 755 may also perform and/or be a means for performing any other operations, methods, or processes described and/or illustrated herein.

Memory 760 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 700 may include both a volatile memory unit and a non-volatile storage device. In one example, program instructions implementing rule controller 110 and/or network sensor testing manager 145 may be loaded into memory 760.

In certain embodiments, computing system 700 may also include one or more components or elements in addition to processor 755 and/or memory 760. For example, as illustrated in FIG. 7, computing system 700 may include a memory controller 720, an Input/Output (I/O) controller 735, and a communication interface 745, each of which may be interconnected via a communication infrastructure 705. Communication infrastructure 705 generally represents any type or form of infrastructure capable of facilitating communication between one or more components of a computing device. Examples of communication infrastructure 705 include, without limitation, a communication bus (such as an Industry Standard Architecture (ISA), Peripheral Component Interconnect (PCI), PCI express (PCIe), or similar bus) and a network.

Memory controller 720 generally represents any type/form of device capable of handling memory or data or controlling communication between one or more components of computing system 700. In certain embodiments memory controller 720 may control communication between processor 755, memory 760, and I/O controller 735 via communication infrastructure 705. In certain embodiments, memory controller 720 may perform and/or be a means for performing, either alone or in combination with other elements, one or more of the operations or features described and/or illustrated herein. I/O controller 735 generally represents any type or form of module capable of coordinating and/or controlling the input and output functions of a computing device. For example, in certain embodiments I/O controller 735 may control or facilitate transfer of data between one or more elements of computing system 700, such as processor 755, memory 760, communication interface 745, display adapter 715, input interface 725, and storage interface 740.

Communication interface 745 broadly represents any type/form of communication device/adapter capable of facilitating communication between computing system 700 and other devices and may facilitate communication between computing system 700 and a private or public network. Examples of communication interface 745 include, a wired network interface (e.g., network interface card), a wireless network interface (e.g., a wireless network interface card), a modem, and any other suitable interface. Communication interface 745 may provide a direct connection to a remote server via a direct link to a network, such as the Internet, and may also indirectly provide such a connection through, for example, a local area network. Communication interface 745 may also represent a host adapter configured to facilitate communication between computing system 700 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 700 may also include at least one display device 710 coupled to communication infrastructure 705 via a display adapter 715 that generally represents any type or form of device capable of visually displaying information forwarded by display adapter 715. Display adapter 715 generally represents any type or form of device configured to forward graphics, text, and other data from communication infrastructure 705 (or from a frame buffer, as known in the art) for display on display device 710. Computing system 700 may also include at least one input device 730 coupled to communication infrastructure 705 via an input interface 725. Input device 730 generally represents any type or form of input device capable of providing input, either computer or human generated, to computing system 700. Examples of input device 730 include a keyboard, a pointing device, a speech recognition device, or any other input device.

Computing system 700 may also include storage device 750 coupled to communication infrastructure 705 via a storage interface 740. Storage device 750 generally represents any type or form of storage devices or mediums capable of storing data and/or other computer-readable instructions. For example, storage device 750 may include a magnetic disk drive (e.g., a so-called hard drive), a floppy disk drive, a magnetic tape drive, an optical disk drive, a flash drive, or the like. Storage interface 740 generally represents any type or form of interface or device for transmitting data between storage device 750, and other components of computing system 700. Storage device 750 may be configured to read from and/or write to a removable storage unit configured to store computer software, data, or other computer-readable information. Examples of suitable removable storage units include a floppy disk, a magnetic tape, an optical disk, a flash memory device, or the like. Storage device 750 may also include other similar structures or devices for allowing computer software, data, or other computer-readable instructions to be loaded into computing system 700. For example, storage device 750 may be configured to read and write software, data, or other computer-readable information. Storage device 750 may also be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7. Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The computer-readable medium containing the computer program may be loaded into computing system 700. All or a portion of the computer program stored on the computer-readable medium may then be stored in memory 760, and/or various portions of storage device 750. When executed by processor 755, a computer program loaded into computing system 700 may cause processor 755 to perform and/or be a means for performing the functions of one or more of the embodiments described/illustrated herein. Alternatively, one or more of the embodiments described and/or illustrated herein may be implemented in firmware and/or hardware.

Network 765 generally represents any type or form of computer network or architecture capable of facilitating communication between rule control server 105 and/or rule management cloud platform and IDSs 145(1)-(N). For example, network 765 can be a Wide Area Network (WAN) (e.g., the Internet) or a Local Area Network (LAN). In certain embodiments, a communication interface, such as communication interface 745 in FIG. 7, may be used to provide connectivity between rule control server 105 and/or rule management cloud platform and IDSs 145(1)-(N), and network 765. The embodiments described and/or illustrated herein are not limited to the Internet or any particular network-based environment.

In some embodiments, rule controller 110 and/or network sensor testing manager 145 may be part of rule control server 105 and/or rule management cloud platform 205, or may be separate. If separate, rule controller 110 and/or network sensor testing manager 145 may be communicatively coupled via network 765. In one embodiment, all or a portion of one or more of embodiments may be encoded as a computer program and loaded onto and executed by rule controller 110 and/or network sensor testing manager 145, or any combination thereof, and may be stored on rule control server 105 and/or rule management cloud platform 205, and distributed over network 765.

In some examples, all or a portion of rule control server 105 and/or rule management cloud platform 205 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, rule controller 110 and/or network sensor testing manager 145 may transform the behavior of rule control server 105 and/or rule management cloud platform 205 to (a) automatically select and curate actionable IDS rules and (b) securely deploy verified and tested IDS rules on network sensors.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
executing an intrusion decision system (IDS) that generates intrusion detection alerts based on an applied ruleset of existing IDS rules;
supplementing the applied ruleset with a list of new IDS rules;
receiving a plurality of alerts generated based on the applied ruleset including both the existing IDS rules and the new IDS rules;
designating, as suppressed alerts, a set of new alerts of the plurality of alerts that were generated based on only the new IDS rules in the applied ruleset; and
eliminating, from the applied ruleset, a first rule of the new IDS rules that caused generation of an excessive number of suppressed alerts exceeding a threshold, wherein
the eliminating of the first rule is performed by a rule control server located remotely from a monitored network.

2. The computer-implemented method of claim 1, wherein
the applied ruleset is sent to one or more network sensors deployed in a monitored network.

3. The computer-implemented method of claim 1, wherein
the list of new IDS rules is a candidate list used during a trial window, and the eliminating of the first rule is performed after the trial window.

4. The computer-implemented method of claim 1, further comprising:
designating a second rule of the new IDS rules as a suppressed rule, wherein alerts generated based on the suppressed rule are filtered by the IDS.

5. The computer-implemented method of claim 1, further comprising:
designating a second rule of the new IDS rules as a suppressed rule, wherein alerts generated based on the suppressed rule are summarized by the IDS.

6. The computer-implemented method of claim 5, further comprising:
providing a summary of the suppressed rule for review by a user; and
adding or eliminating the suppressed rule to or from the applied ruleset based on user input from the user.

7. The computer-implemented method of claim 1, further comprising:
maintaining statistical metadata on each suppressed alert associated with the new IDS rules.

8. The computer-implemented method of claim 1, further comprising:
storing a packet sample generated by the IDS for each suppressed alert.

9. The computer-implemented method of claim 1, wherein
the threshold is determined based on a configuration version of the applied ruleset of an organization identifier associated with the applied ruleset.

10. A system comprising:
one or more computer system that implement an intrusion decision system (IDS), configured to:
generate intrusion detection alerts based on an applied ruleset of existing IDS rules;
supplement the applied ruleset with a list of new IDS rules;
receive a plurality of alerts generated based on the applied ruleset including both the existing IDS rules and the new IDS rules;
designate, as suppressed alerts, a set of new alerts of the plurality of alerts that were generated based on only the new IDS rules in the applied ruleset; and
eliminate, from the applied ruleset, a first rule of the new IDS rules that caused generation of an excessive number of suppressed alerts exceeding a threshold, wherein
the eliminating of the first rule is performed by a rule control server located remotely from a monitored network.

11. The system of claim 10, wherein
the applied ruleset is sent to one or more network sensors deployed in a monitored network.

12. The system of claim 10, wherein
the list of new IDS rules is a candidate list used during a trial window, and the elimination of the first rule is performed after the trial window.

13. The system of claim 10, wherein the IDS is configured to:
designate a second rule of the new IDS rules as a suppressed rule; and
filter alerts generated based on the suppressed rule.

14. The system of claim 10, wherein the IDS is configured to:

designate a second rule of the new IDS rules as a suppressed rule; and summarize alerts generated based on the suppressed rule.

15. The system of claim 14, wherein the IDS is configured to:

provide a summary of the suppressed rule for review by a user; and add or eliminate the suppressed rule to or from the applied ruleset based on user input from the user.

16. The system of claim 10, wherein the IDS is configured to maintain statistical metadata on each suppressed alert associated with the new IDS rules.

17. The system of claim 10, wherein the IDS is configured to store a packet sample generated by the IDS for each suppressed alert.

18. The system of claim 10, wherein the threshold is determined based on a configuration version of the applied ruleset of an organization identifier associated with the applied ruleset.

* * * * *